United States Patent [19]

Russell et al.

[11] Patent Number: 4,508,886

[45] Date of Patent: Apr. 2, 1985

[54] METHOD FOR MAKING ADHESIVE FROM BIOMASS

[75] Inventors: Janet A. Russell, Richland; William F. Riemath, Pasco, both of Wash.

[73] Assignee: The United States of America as represented by the United States Department of Energy, Washington, D.C.

[21] Appl. No.: 595,015

[22] Filed: Mar. 30, 1984

[51] Int. Cl.$^3$ .................. C08L 97/00; C07C 37/28; C08G 8/28; C08H 5/04
[52] U.S. Cl. ......................................... 528/1; 524/16; 524/72; 524/73; 524/74; 524/735; 568/727; 568/762; 527/105
[58] Field of Search ............... 528/1, 2, 3; 568/727, 568/762; 524/16, 74, 72, 73, 735; 527/105

[56] References Cited

U.S. PATENT DOCUMENTS

| | | | |
|---|---|---|---|
| 1,725,791 | 8/1929 | Harvey | 528/3 |
| 1,725,797 | 8/1929 | Harvey | 528/3 |
| 1,921,293 | 8/1933 | Harvey | 528/3 |
| 2,937,158 | 5/1960 | Snyder | 528/1 X |
| 4,098,765 | 7/1978 | Kays et al. | 528/1 |
| 4,201,851 | 5/1980 | Chen | 528/1 |
| 4,209,647 | 6/1980 | Gallivan et al. | 568/762 |
| 4,223,465 | 11/1980 | Gallivan et al. | 568/727 |
| 4,289,663 | 9/1981 | Johansson | 528/1 |
| 4,433,126 | 2/1984 | Hsu et al. | 528/1 X |

*Primary Examiner*—Howard E. Schain
*Attorney, Agent, or Firm*—Robert Southworth, III; Richard E. Constant

[57] ABSTRACT

A method is described for making adhesive from biomass. A liquefaction oil is prepared from lignin-bearing plant material and a phenolic fraction is extracted therefrom. The phenolic fraction is reacted with formaldehyde to yield a phenol-formaldehyde resin.

4 Claims, 2 Drawing Figures

METHOD FOR MAKING ADHESIVE FROM BIOMASS

The United States Government has rights in this invention pursuant to Contract No. DE-AC06-76RL01830 between the U.S. Department of Energy and Battelle.

BACKGROUND OF THE INVENTION

The invention relates generally to making of adhesive from plant materials and more particularly to the making of adhesive from liquefaction oil produced from lignocellulosic plant material or biomass.

In the manufacture of plywood successive layers of wood may be bonded together with phenol-formaldehyde adhesives. Because the production of petroleum-base phenol may be expensive, there have been various efforts to at least partially substitute the phenol with woodbased products or extracts such as tannins or bark extracts.

Gallivan in U.S. Pat. Nos. 4,209,647 and 4,223,465 discloses a method for recovering a phenolic fraction from oil obtained by pyrolysis of lignocellulosic materials and the subsequent use of that fraction in making phenol-formaldehyde resin. However, this process suffers the disadvantage of requiring pyrolysis oils which are usually formed at a higher temperature and which require a dry feedstock.

The inventors have discovered a process for making phenol-formaldehyde type resins from liquefaction oils. Liquefaction oils are also derived from lignocellulosic plant materials or biomass, but are produced at lower temperatures, at higher pressures, and in the presence of water.

It is accordingly, an object of this invention to provide a method for producing a readily available substitute for phenol-formaldehyde resins.

It is a further object of this invention to produce an adhesive from oils produced from lignocellulosic plant materials under liquefaction conditions in the presence of water.

Other objects, advantages, and novel features of the invention will be apparent to those of ordinary skill in the art upon examination of the following detailed description of a preferred embodiment of the invention and the accompanying drawings.

SUMMARY OF THE INVENTION

A method is provided for the production of an adhesive from liquefaction oil derived from lignocellulosic plant material. A phenolic fraction is extracted from the liquefaction oil; the phenolic fraction is reacted with formaldehyde to yield a phenol-formaldehyde resin; and the phenol-formaldehyde resin is formulated into an adhesive.

DESCRIPTION OF THE PREFERRED EMBODIMENT

Figure 1:
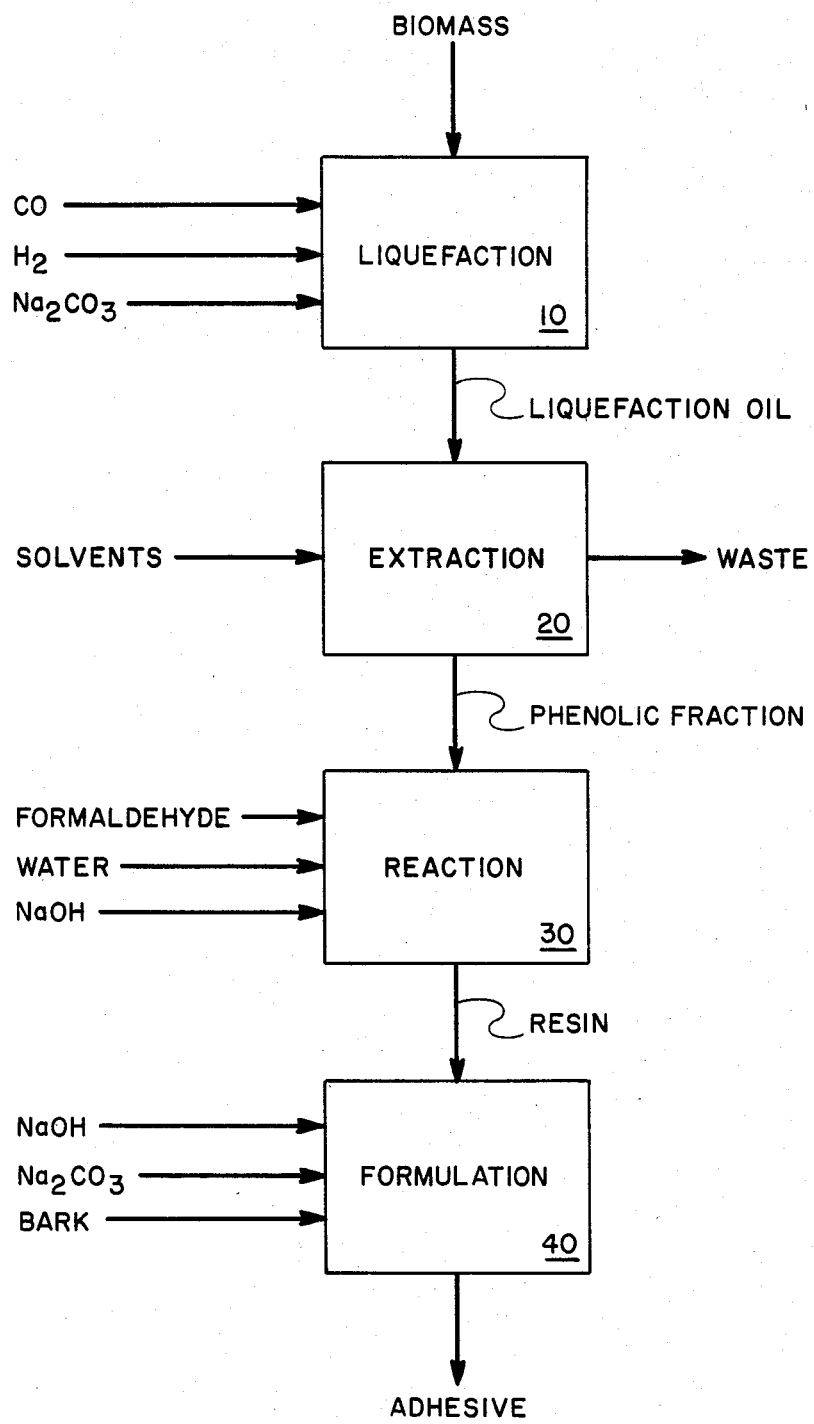
FIG. 1 is a flowchart illustrating the overall process of the invention.

Turning now to the drawings, initially FIG. 1, it is seen that the overall process of this invention may be described in four steps. Lignin-bearing plant material or biomass is first subjected to liquefaction 10; a phenolic fraction is separated from a resulting lignin liquefaction oil in an extraction step 20; the phenolic fraction is reacted with formaldehyde in reaction step 30 to yield a resin; and the resin is further processed in formulation step 40 to arrive at the desired adhesive.

The liquefaction step 10 may utilize any plant material which contains lignin as sawdust, woodchips, agricultural residues, peat moss, or the like. The lignin-bearing material may be typically liquified by heating to about 290 to 350 C. for about 0.25 to 1 hour at a pressure of about 1500 to 3000 psi in the presence 60 to 80 weight percent water and utilizing an alkaline catalyst such as sodium carbonate or calcium carbonate. Optionally, a cover gas, such as a mixture of hydrogen and carbon monoxide, may be employed. The resulting product is known as liquefaction oil and has elsewhere been proposed as a substitute fuel. This liquefaction oil contains a high percentage of phenolic compounds, and differs from pyrolysis oils in that it is prepared in the presence of water.

Figure 2:
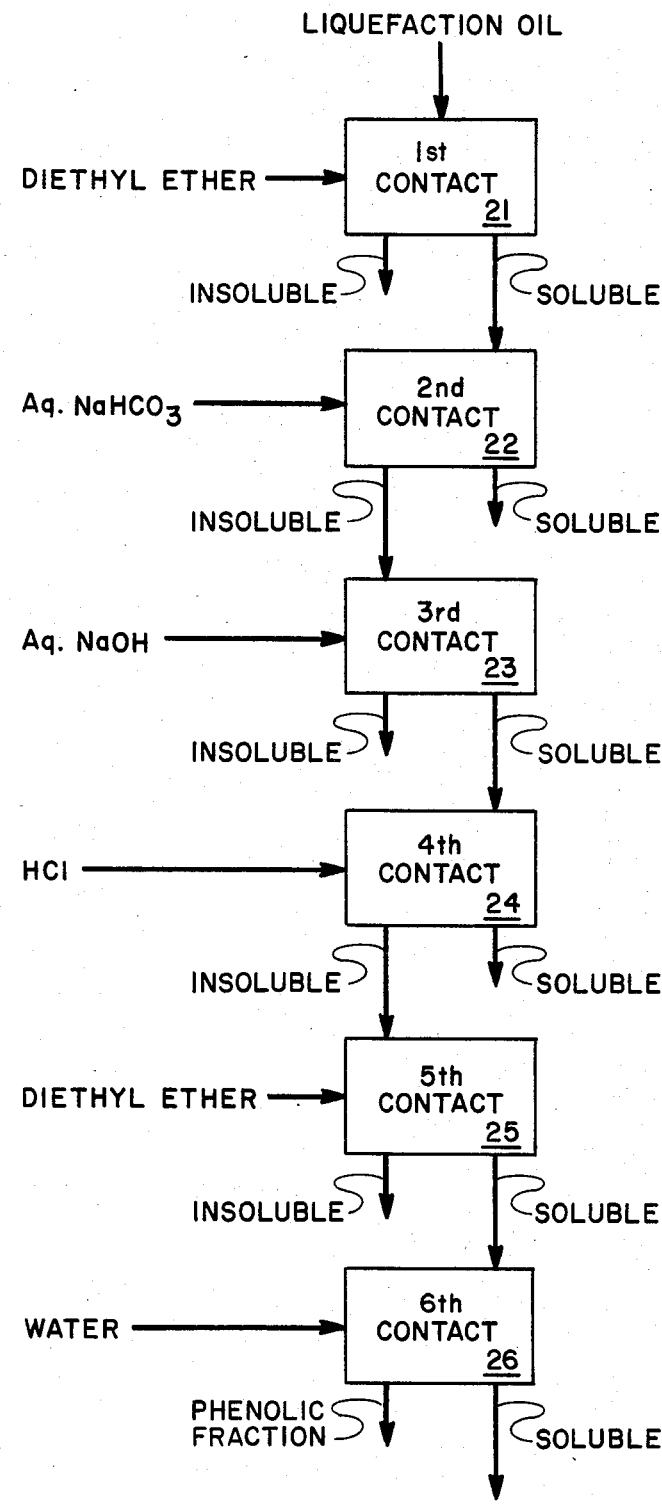
FIG. 2 is a flowchart further detailing the extraction step of the process of the invention.

The extraction step 20 is further detailed in FIG. 2. The liquefaction oil is first contacted 21 with a suitable solvent such as diethyl ether resulting in a first soluble and first insoluble fraction. The first soluble fraction is then contacted 22 with a weak base such as aqueous sodium bicarbonate resulting in a second soluble and a second insoluble fraction. The second insoluble fraction is then contacted 23 with a strong base such as aqueous sodium hydroxide resulting in a third soluble and a third insoluble fraction. The third soluble fraction is then contacted 24 with an acid such as hydrochloric acid resulting in a fourth soluble and a fourth insoluble fraction. The fourth insoluble fraction is then contacted 25 with a suitable solvent such as diethyl ether resulting in a fifth soluble and a fifth insoluble fraction. The fifth soluble fraction is then contacted 26 with water resulting in a phenolic fraction and a sixth soluble fraction.

Returning to FIG. 1, the phenolic fraction is converted into a resin in reaction step 30. In general terms this involves mixing the phenolic fraction with formaldehyde and sodium hydroxide and heating. In the preferred embodiment, 100 parts by weight of the phenolic fraction is mixed with 1330 parts of 37% formaldehyde, 660 parts water, and 460 parts of sodium hydroxide added in increments during the reaction. The mixture is heated to about 70–80 C. for six hours.

The resulting resin is then formulated 40 into an adhesive by the addition of more sodium hydroxide, sodium carbonate, and powdered bark and heating to 60 C. for an additional thirty minutes. In the preferred embodiment 100 parts by weight of resin is mixed with 6 parts of 50% sodium hydroxide, 3 parts sodium carbonate and 3 parts powdered bark.

EXAMPLE

Wood liquefaction oil was obtained from the Albany, Oreg. pilot plant. This liquefaction oil was produced from Douglas fir flour, with aqueous sodium carbonate used as a catalyst. The reaction proceeded in a standpipe reactor with a fired tubular preheater at a temperature of 330 C., a reaction time of 18 minutes, a reaction pressure of 3000 psi, and with a cover gas of carbon monoxide/hydrogen.

An extract was prepared from this liquefaction oil by successively contacting it with diethyl ether, aqueous sodium bicarbonate, aqueous sodium hydroxide, hydrochloric acid, diethyl ether, and water.

To each 5 g of extract 66.5 ml of 37% formaldehyde, 33 ml of water, and 23 g NaOH were added. The NaOH was added in 3 increments, an hour apart, to avoid immediate destruction of the formaldehyde. The mixture was heated to 70–80 C. for six hours. Reaction completion was determined by monitoring free formaldehyde concentration using gas chromatography.

Adhesvie was produced from the resulting resin by adding to each 100 ml of resin, 15 cc powdered bark, 6 cc of 50% NaOH, and 3 cc $Na_2CO_3$. The mixture was stirred at 60 C. for 30 minutes and then cooled. The resulting adhesive poured and spread easily at room temperature. It was also water-soluble before curing, which allowed easy equipment cleanup.

To test the adhesive, two squares of birch veneer plywood were spread with the glue and bonded together in a press at 280° F. at a pressure of about 85 psi. After curing, tensile strength of the samples was measured with an Instron. Of six samples, only one failed at the glue line between the two pieces of plywood; tensile strength was 46 psi. For the other five samples, failure occured within the commercial glue in the plywood at a range of 85 to 235 psi. It may be concluded that the new glue has a bond strength it excess of that of the commercial glue.

The foregoing description of a preferred embodiment of the invention has been presented for purposed of illustration and description and is not intended to be exhaustive or to limit the invention to the precise form disclosed. It was chosen and described in order to list explain the principles of the invention and their practical application to thereby enable others skilled in the art to best utilize the invention in various embodiments and with various modifications as are suited to the particular use contemplated. It is intended that the scope of the invention be defined by the claims appended hereto.

We claim:

1. A method for making adhesive from lignin comprising:
   a. preparing a liquefaction oil from lignin-bearing plant material by heating said lignin-bearing plant material to about 290 to 350 C. from about 0.25 to 1 hours at a pressure of about 1500 to 3000 psi in the presence of water and an alkaline catalyst;
   b. recovering said liquefaction oil;
   c. extracting a phenolic fraction from said liquefaction oil;
   d. reacting said phenolic fraction with formaldehyde and thereby producing a phenol-formaldehyde resin; and
   e. formulating an adhesive from said resin.

2. The method of claim 1 wherein said extraction step further comprises:
   a. contacting said liquefaction oil with a solvent resulting in a first soluble and a first insoluble fraction;
   b. contacting said first soluble fraction with a weak base resulting in a second soluble and a second insoluble fraction;
   c. contacting said second insoluble fraction with a strong base resulting in a third soluble and a third insoluble fraction;
   d. contacting said third soluble fraction with an acid resulting in a fourth soluble and a fourth insoluble fraction;
   e. contacting said fourth insoluble fraction with a solvent resulting in a fifth soluble and a fifth insoluble fraction; and
   f. contacting said fifth soluble fraction with water resulting in a sixth soluble fraction and said phenolic fraction.

3. The method of claim 2 wherein said solvent is diethyl ether, said weak base is aqueous $NaHCO_3$, said strong base is aqueous NaOH, and said acid is HCl.

4. A method for making adhesive from lignin comprising:
   a. heating a lignin-bearing plant material to about 290 to 350 C. for about 0.25 to 1 hours at a pressure of about 1500 to 3000 psi in the presence of water and an alkaline catalyst;
   b. recovering a liquefaction oil;
   c. contacting said liquefaction oil with diethyl ether resulting in a first soluble and a first insoluble fraction;
   d. contacting said first soluble fraction with aqueous $NaHCO_3$ resulting in a second soluble and a second insoluble fraction;
   e. contacting said second insoluble fraction with aqueous NaOH resulting in a third soluble and a third insoluble fraction;
   f. contacting said third soluble fraction with HCl resulting in a fourth soluble and a fourth insoluble fraction;
   g. contacting said fourth insoluble fraction with diethyl ether resulting in a fifth soluble and fifth insoluble fraction;
   h. contacting said fifth soluble fraction with water resulting in a sixth soluble fraction and a phenolic fraction;
   i. mixing (by weight)
      100 parts said phenolic fraction,
      1330 parts 37% formaldehyde,
      660 parts water, and
      460 parts NaOH;
   j. heating the mixture of step g. to about 70–80 C. for about 6 hours thereby producing a phenol-formaldehyde resin;
   k. mixing (by weight)
      100 parts said phenol-formaldehyde resin,
      3 parts powdered bark,
      6 parts 50% NaOH, and,
      3 parts $Na_2CO_3$; and
   l. heating the mixture of step j. to about 60 C. for about 0.5 hours thereby resulting in said adhesive.

* * * * *